US007119329B2

(12) United States Patent
Shimomura et al.

(10) Patent No.: US 7,119,329 B2
(45) Date of Patent: Oct. 10, 2006

(54) METHOD OF PREPARING AND RECONDITIONING AN ELECTRODE OF MASS SPECTROMETER

(75) Inventors: Manabu Shimomura, Kyoto (JP); Hiroto Itoi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/137,485

(22) Filed: May 26, 2005

(65) Prior Publication Data

US 2005/0211895 A1 Sep. 29, 2005

Related U.S. Application Data

(63) Continuation of application No. 10/234,097, filed on Sep. 5, 2002, now abandoned.

(30) Foreign Application Priority Data

Sep. 17, 2001 (JP) ............................ 2001-280862

(51) Int. Cl.
*B01D 59/44* (2006.01)
*H01J 49/26* (2006.01)
*C21D 9/67* (2006.01)

(52) U.S. Cl. ...................... 250/282; 250/281; 250/283; 250/288; 250/289; 148/596; 148/597

(58) Field of Classification Search ................. 250/282
See application file for complete search history.

(56) References Cited

U.S. PATENT DOCUMENTS 3,614,420 A * 10/1971 Dillenbeck .................. 250/290
5,055,678 A 10/1991 Taylor et al.
5,629,519 A * 5/1997 Palermo ..................... 250/292
5,644,131 A * 7/1997 Hansen ....................... 250/292
5,796,100 A * 8/1998 Palermo ..................... 250/292
5,864,459 A * 1/1999 Lu et al. ..................... 361/234
5,916,388 A * 6/1999 Shiokawa ................... 148/596
6,287,432 B1 * 9/2001 Mazanec et al. ............ 204/265
2003/0052266 A1 * 3/2003 Shimomura et al. ........ 250/281
2005/0211895 A1 * 9/2005 Shimomura et al. ........ 250/288

FOREIGN PATENT DOCUMENTS

JP 5-171479 7/1993

OTHER PUBLICATIONS

J.D. Redmond, "Stainless Steels", Marks' Standard Handbook for Mechanical Engineers, 1996, p. 6-32 to 6-37.*
R.J. Reid, "Cleaning for Vacuum Service", <http://www.astec.ac.uk/vacsi/PDF's/Cleaning_Chapter.pdf>.*
Stainless Steel World, "Austenitic stainless steel—Basic facts", □□<http://www.stainless-steel-world.net/basicfacts/what_austentic.asp>.*

* cited by examiner

*Primary Examiner*—Nikita Wells
*Assistant Examiner*—Bernard Souw
(74) *Attorney, Agent, or Firm*—Manabu Kanesaka

(57) ABSTRACT

In a mass spectrometer, an ion of a sample gas is produced in an ion source by colliding the gas with an electron beam, and is introduced into a magnetic field or an electric field. The ion is separated based on the mass number, and the sample is analyzed from a mass spectrum. The ion source has an electrode made of stainless steel, which is baked at a temperature in a range from 200° C. to 700° C. in an air atmosphere.

4 Claims, 4 Drawing Sheets

METHOD OF PREPARING AND RECONDITIONING AN ELECTRODE OF MASS SPECTROMETER

CROSS-REFERENCE TO RELATED APPLICATION

This is a continuation application of Ser. No. 10/234,097 filed on Sep. 5, 2002 now abandoned.

BACKGROUND OF THE INVENTION AND RELATED ART STATEMENT

This invention relates to a mass spectrometer for measuring a quantity of ions produced by impacting a sample gas with an electron beam to ionize, introducing the produced ions into a magnetic field or electric field, and separating the ions according to their mass numbers to determine their ion numbers. In particular, this invention relates to a technique for preventing a sample gas from being decomposed at an ion source or in a trap to adhere and deposit on electrodes or the like.

A mass spectrometer is an analyzer in which a sample molecule is collided with the electron beam with several tens of electron volts (eV) to ionize, and the produced ions are introduced into a magnetic field or an electric field to separate according to the mass number. Then, a mass spectrum with the mass number in a horizontal axis and the ion quantity in a vertical axis is created to determine the sample molecules.

The mass spectrometer is classified into a magnetic field type and an electric field type based on the mass separating method. FIG. 3(*a*) shows a principle of the magnetic field type mass spectrometer, and FIG. 3(*b*) shows a principle of the electric field type mass spectrometer.

In the magnetic field type mass spectrometer, an instrument is maintained under a high vacuum of $10^{-6}$ to $10^{-8}$ Torr. A sample gas is introduced into an ion source 10 at a constant flow rate, and the sample gas is subjected to impact of the electron beam having energy of the order of 50 to 100 eV to ionize the sample gas. Acceleration electrodes 2 accelerate the ions from the ion source 10 to enter a magnetic field 3. A path of the ions inside the magnetic field 3 is curved according to the Fleming's left hand rule, and then a detector 5 detects the ions after passing through a collector slit 4. Since the curve radius is different depending on the mass number, a mass spectrum can be obtained.

In the case of the electric field type mass spectrometer, a sample gas is ionized at the ion source 10. Accelerating electrodes 2*a* accelerate the ions to introduce into an electric field created by quadruple electrodes 3*a*. A direct current voltage and a high frequency voltage, i.e. $\pm(U+V \cos \omega t)$, are applied to four bar-shape electrodes disposed in parallel to each other. When the ions enter the electric field under a specific frequency condition, only the ions with a specific mass number pass through with specific amplitude defined by the x-axis and y-axis. The ions with other mass numbers have amplitude that exponentially increases with time, and eventually collide with the electrodes. Therefore, only the ions with the specific mass number satisfying the electric field condition can pass through and reach a secondary electron multiplier 5*a* to be detected. By sweeping the electric field to sequentially change the electric field condition, the mass spectrum is obtained.

A method of ionizing the sample in the ion source 10 of the mass spectrometer includes an electron ionization method (EI method) by an electron and a chemical ionization method (CI method) by a reactive gas ion. The electron ionization method has been most widely used. When an electron beam hits a molecule with energy more than necessary to separate an electron from the outmost orbit of the molecule, a molecular ion (a parent ion) without the electron on the outmost orbit is produced in addition to various ions (fragmented ions) with cut off internal bonds. In the electron ionization method, it is possible to conduct analysis from a mass spectrum of the fragmented ions produced by the fragmentation (ion cleavage). As opposed to the electron ionization method, the chemical ionization method uses an ionization method in a milder condition. As the fragmentation is difficult to take place, information regarding a molecular weight can be obtained.

FIG. 4 is a schematic view showing an ion source 10 according to the conventional electron ionization method. A sample introduction pipe 19 is connected to an ionization chamber 20 disposed in a vacuum atmosphere. A gas sample is introduced into the ionization chamber 20 through the pipe. A filament 11 for generating thermoelectron is disposed outside a thermoelectron irradiating opening 11*a* with an opening on a wall surface of the ionization chamber 20. When a power current is supplied to the filament 11 from a current source 11*b*, the temperature of the filament 11 is increased to thereby discharge the thermoelectrons.

The thermoelectrons (e− in FIG. 4) are attracted by a potential difference between the filament 11 and the trap electrode 12 to enter the ionization chamber 20, and further accelerated toward the trap electrode 12. When the thermoelectron beam collides against the sample molecule, electrons are kicked out from the sample molecules, so that the molecules become positive ions. The generated ions jump out of the ionization chamber 20 through the ion exit 21. Then, the acceleration electrodes 2 (or 2*a*) pull and accelerate the ions as shown in FIGS. 3(*a*) and 3(*b*) to introduce into the mass spectrometer system. Since the number of electrons trapped in the trap electrode 12 depends on the number of electrons discharged from the filament 11, a controlling portion 11*c* controls the current source 11*b* so that an electric current of the thermoelectrons trapped at the trap electrode 12 becomes a specific value. Thus, the quantity of the thermoelectrons at the filament 11 becomes substantially constant, so that a stable ionization can be attained in the ionization chamber 20.

The conventional mass spectrometer is structured as described above. However, an inner surface of the analysis instrument, especially at the ion source having the electrodes for generating the electric field or the ion trap, is exposed to the sample gas molecules. As a result, a specific sample gas is decomposed and deposited on the surface, causing an unexpected result due to an interaction with the ions. For example, a catalytic reaction due to a chemical reaction may take place on the surface, and an analysis result may be distorted. Also, the surface tends to promote the sample molecules to be deposited and increases a temperature.

The catalytic action of the deposited sample material inside the instrument affects the measurement. To prevent the effect, the following approaches have been proposed: a method in which chrome or chromium oxide is coated on a surface of the electrodes of the ion source and the ion trap; a method in which an organic silane reagent is chemically bonded to the surface; a method in which an inert fused silica is coated on the surface with a thickness of 0.02 to 0.1 μm; and a method in which alumina, silicon nitride, a selected semiconductor material or the like is coated on the surface, or these materials are alternatively coated. In the surface treatment of the inert fused silica, alumina, silicon nitride and the like, an inert non-organic, non-metallic material is coated on the electrode with a minimum thickness to prevent pin-holes, therefore taking advantage of insulation and the electric field formation. However, it is not easy for an operator to perform such surface treatments. Therefore, the ion source and ion trap are difficult to be maintained by the operator.

In view of the above problems, the present invention has been made and an object of the invention is to provide a mass spectrometer wherein an analyst can easily carry out maintenance of an ion source and ion trap.

Further objects and advantages of the invention will be apparent from the following description of the invention.

SUMMARY OF THE INVENTION

To attain the above objects, according to a mass spectrometer of the present invention, an ion of a sample gas is produced in an ion source by impacting an electron beam, and is introduced into a magnetic field or an electric field. The ion is separated based on the mass number and the sample is analyzed from a mass spectrum. The mass spectrometer includes the ion source having an electrode made of a stainless steel, which is baked at a temperature in a range of from 200° C. to 700° C. in an air atmosphere.

Also, in a mass spectrometer according to the present invention, an ion of a sample gas is produced by impacting an electron beam, and is temporally held in a trap. Then, the produced ion is introduced into the magnetic field or the electric field from a trap. The ion is separated based on the mass number and the sample is analyzed from a mass spectrum. The mass spectrometer includes the trap having an electrode made of stainless steel baked at a temperature in a range of 200° C. to 700° C. in an air atmosphere.

The mass spectrometer according to the present invention is structured as described above. The electrodes used for the ion source or ion trap are made of stainless steel, and the electrodes are baked at a temperature in a range of 200° C. to 700° C. in an open air when the maintenance is carried out. The decomposed sample molecules do not adhere and deposit on the surfaces of the stainless steel electrodes, and there is no interaction with the ions and the like. Thus, stable analysis can be carried out.

DETAILED DESCRIPTION OF PREFERRED EMBODIMENTS

Figure 1:
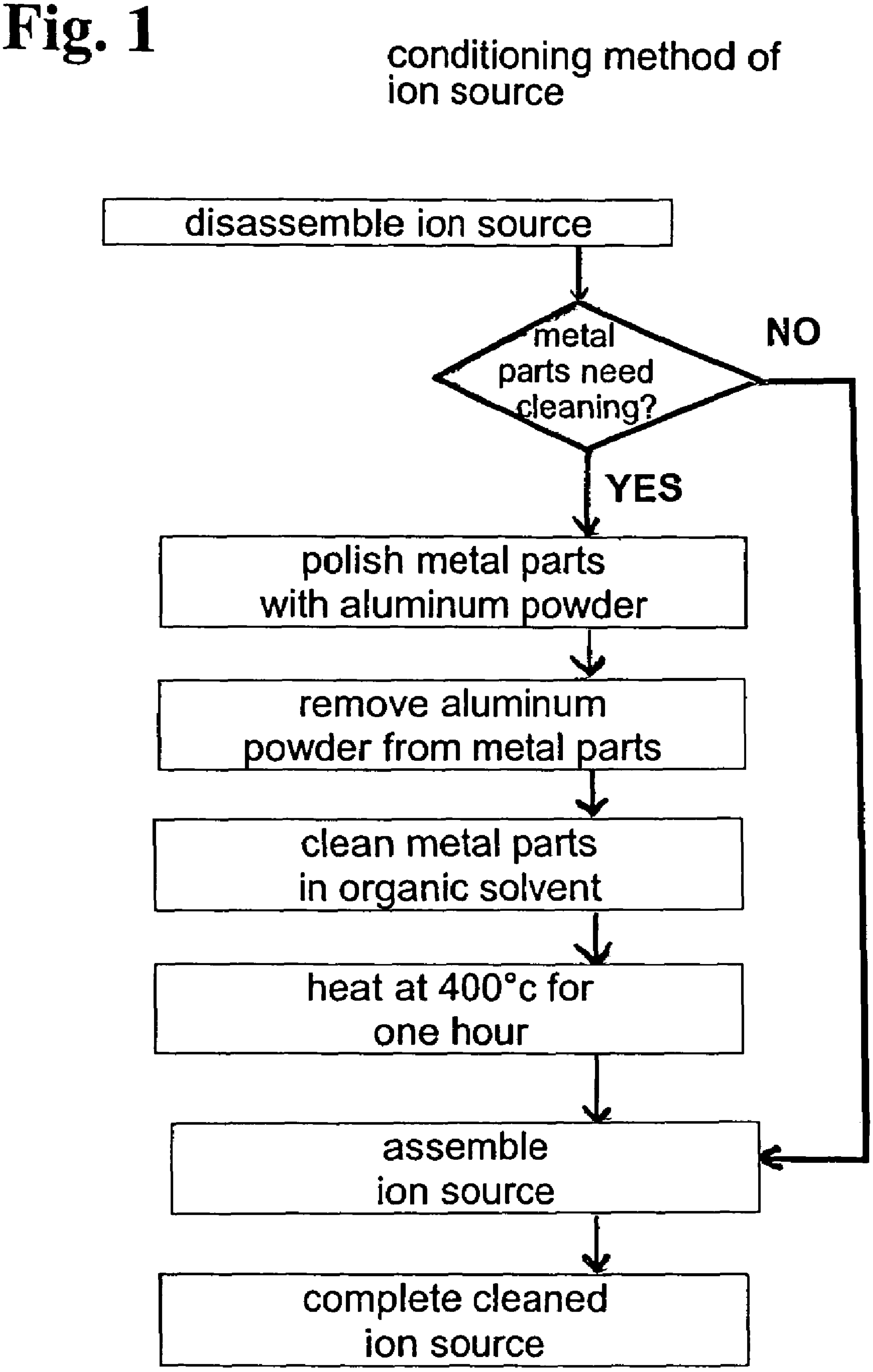
FIG. 1 is a flow chart of a conditioning method of an ion source of a mass spectrometer according to the present invention.

Hereunder, embodiments of the present invention will be explained with reference to the accompanied drawings. FIG. 1 is a flow chart of a conditioning method of an ion source in a mass spectrometer according to the present invention.

Figure 3A:
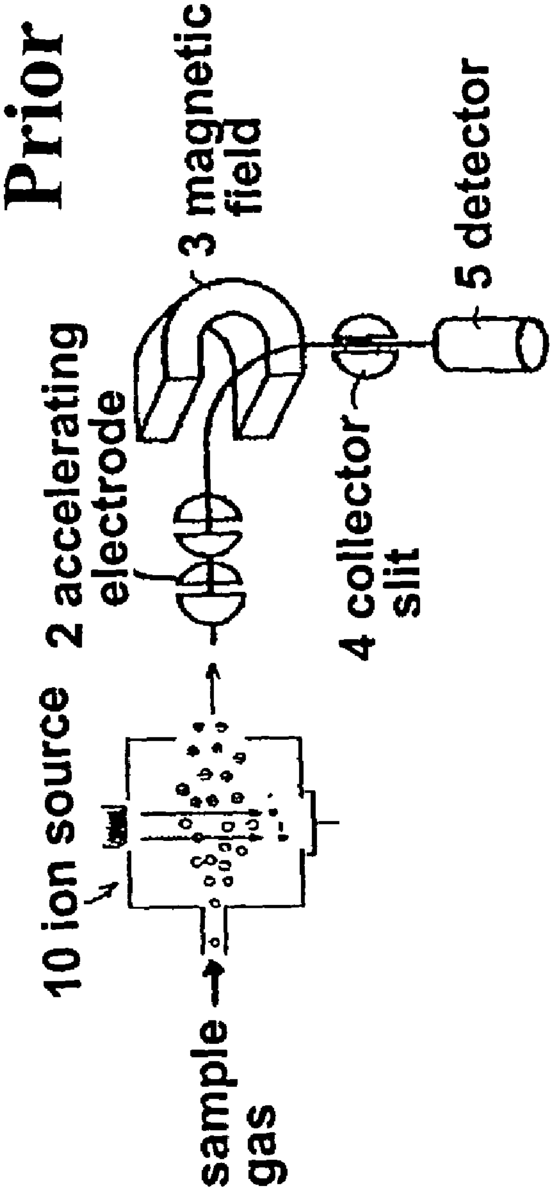
Fig. 3(a) Prior Art
FIG. 3(*a*) is a view showing a structure of a conventional magnetic field type mass spectrometer, and FIG. 3(*b*) is a view showing a structure of a conventional electric field type mass spectrometer.
Figure 3B:
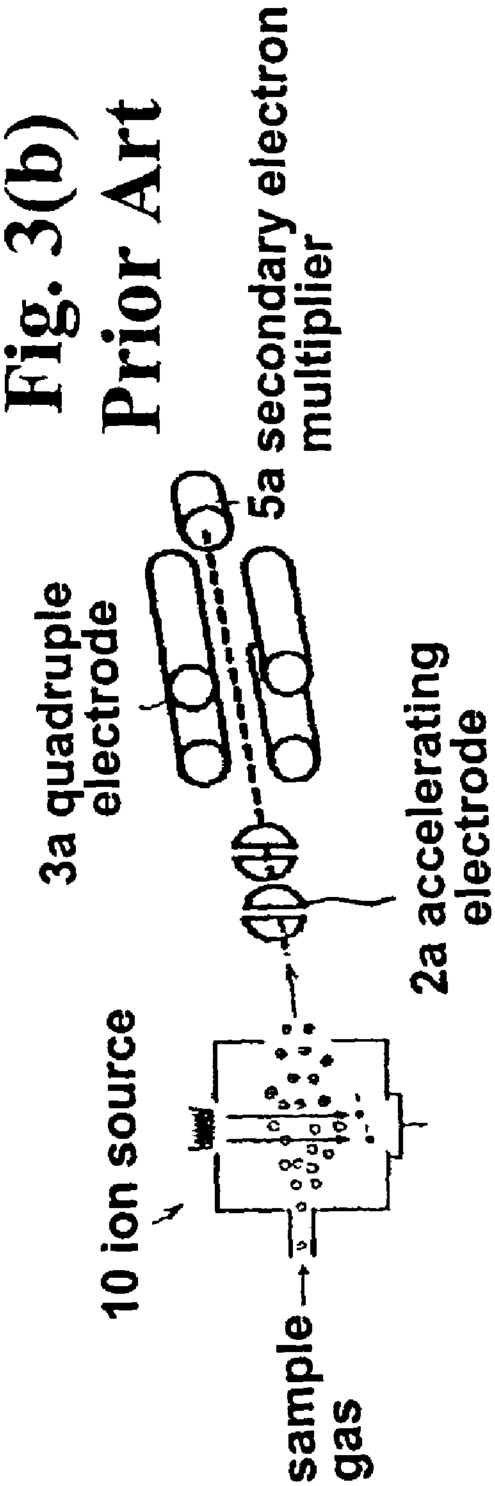
Fig. 3(b) Prior Art

A mass spectrometer of the invention includes an ion source or a trap having an electrode made of stainless steel and baked at a temperature in a range of 200° C. to 700° C. in an air atmosphere; an accelerating electrode 2 (or 2*a*) for accelerating the ions from the ion source or the trap to enter an analyzing system as shown on the right side of FIGS. 3(*a*), 3(*b*); a magnetic field 3 (or quadruple electrode 3*a*) for separating the accelerated ions based on the mass number; and a detector (a detector 5 or a secondary electron multiplier 5*a*) for detecting the separated ions.

While the mass spectrometer of the invention has the same structure as that of the prior art shown in FIGS. 3(*a*) to 4, a material of the electrode used in the ion source 10 and the trap and a treatment method thereof are different from those of the prior art.

In the mass spectrometer according to the present invention, a material of the electrode used for the ion source or trap is stainless steel, and the electrode is baked at a temperature in a range of 200° C. to 700° C. in an air atmosphere.

In the present invention, stainless steel is used as an electrode material. In the conventional electrode, nickel, molybdenum, pure iron plated with nickel, Monel, austenite stainless steel and the like have been used. However, since there is an electric adsorption in addition to physical and chemical adsorption of gas, the ions produced by the electrolytic dissociation are subjected to an interaction with a deposit on a surface thereof by an image force, electrostatic polarization, permanent dipole or the like, causing the catalytic reaction. Therefore, in addition to a molecular ion (a parent ion) wherein an electron is lost from a molecule, various ions (i.e., fragment ions) with broken internal bonds are produced, so that the fragmentation takes place strongly due to the surplus energy. As a result, depending on a type of molecule, the parent ion may not be detected.

The reason for using stainless steel as the electrode material is that stainless steel contains, as prominent components thereof, iron, nickel, chrome and the like, and chrome on the surface of stainless steel has a strong affinity with oxygen. Thus, when stainless steel is baked at an elevated temperature in an open air, the surface of the electrode is oxidized to produce a chromium dioxide and chromium oxide. Due to this oxidization, an alloy composition in the vicinity thereof may be changed and slightly magnetized. Since the material is softened at a temperature above 700° C., the temperature treatment should be carried out at a temperature in a range from 200° C. to 700° C., lower than the softening temperature.

The chromium dioxide and chromium oxide are formed on the surface as a non-reactive thin oxide layer to reduce pin holes, so that the ions and the like of the sample molecule are hard to adhere thereto.

Next, a method with which an operator or analyst can easily treat the electrode material of the ion source in the mass spectrometer of the invention will be explained.

In a method for treating or conditioning, the electrode of the ion source or the trap, as shown in FIG. 1, first, the ion source or the trap (hereinafter simply referred to as "the ion source") is disassembled. Then, the separated parts are divided into metal parts requiring cleaning and the other parts. Only the metal parts are polished by aluminum powder for a specific time. Then, the metal parts are taken out and the aluminum powder is blown off to remove. Thereafter, the metal parts are cleaned in an organic solvent. Then, the metal parts are heated in an electric furnace for one hour in an air atmosphere at a temperature of 400° C. (or a temperature within a range of 200° C. to 700° C. according to a shape and thickness of the electrode). Thereafter, the parts are assembled into a conditioned ion source.

Figure 2A:
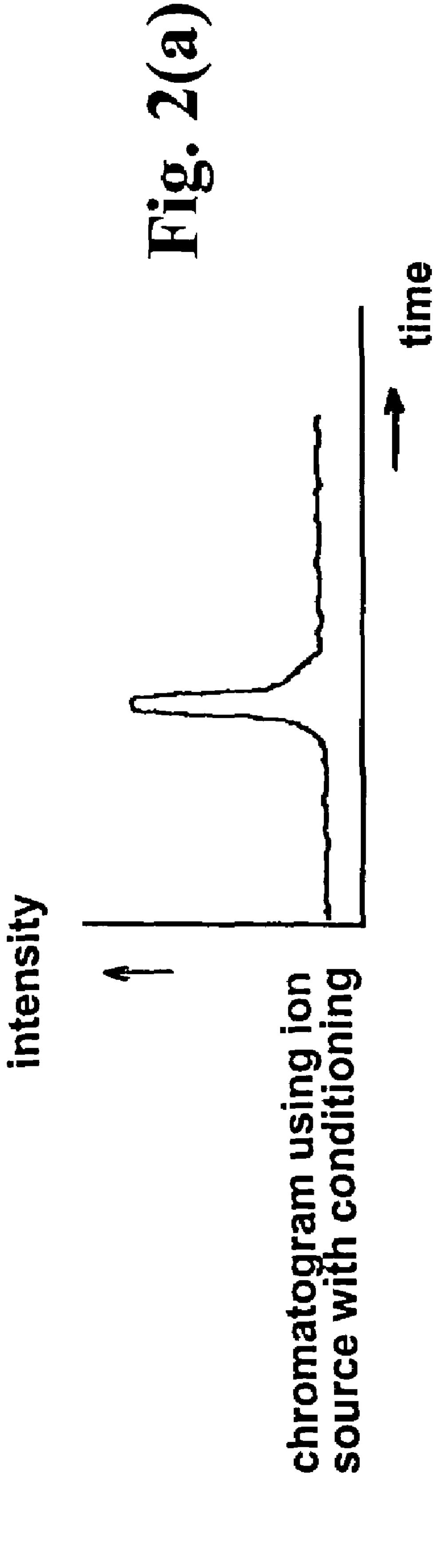
FIG. 2(*a*) is a chromatogram of the mass spectrometer when an ion source is conditioned, and FIG. 2(*b*) is a chromatogram of the mass spectrometer when an ion source is not conditioned.
Figure 2B:
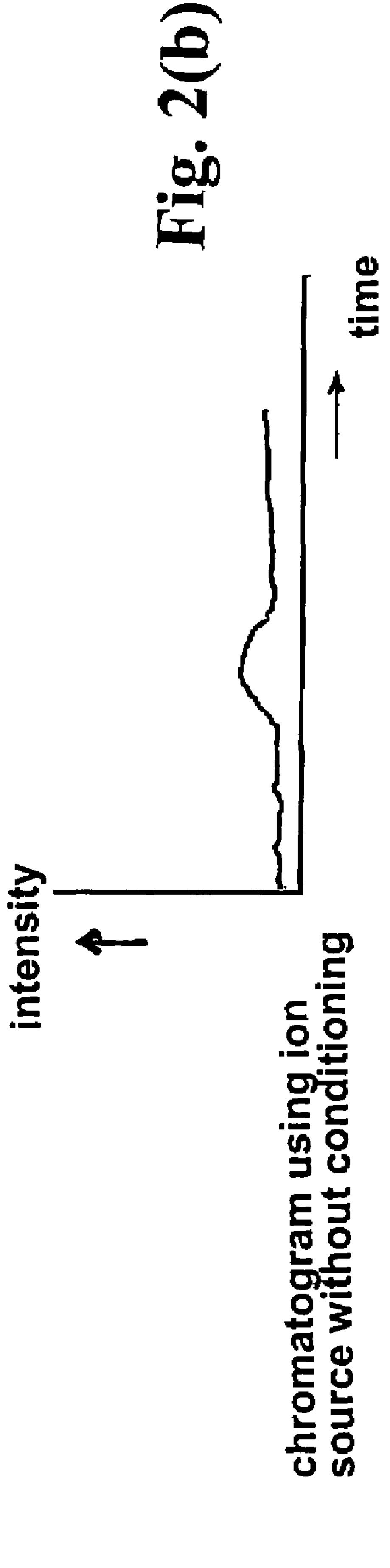

FIG. 2(*a*) shows a chromatogram using the electrode of the ion source with the conditioning; and FIG. 2(*b*) shows a chromatogram using the electrode of the ion source without the conditioning. The horizontal axis represents time and the vertical axis represents an intensity of analysis signal. When using the ion source with the conditioning, a sharp peak value is obtained, while when using the ion source without the conditioning, a broad and inseparable curve is obtained. With the treatment as described above, the catalysis effect of the interaction with the ions on the surface of the electrode is eliminated, thus the mass spectrometer can have a high sensitivity.

Figure 4:
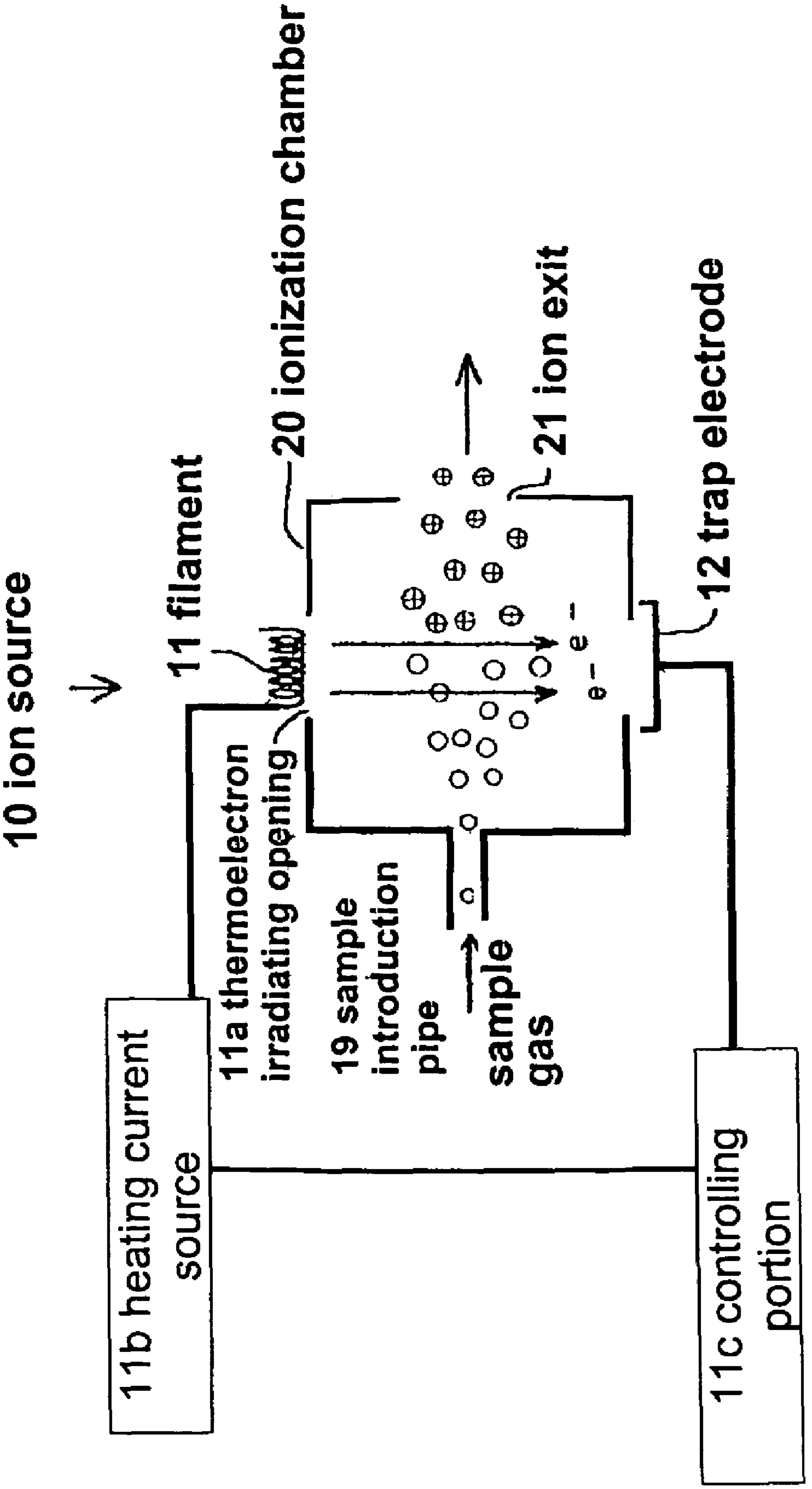
Fig. 4 Prior Art
FIG. 4 is a block diagram showing an ion source of the conventional mass spectrometer.

Next, as shown in FIG. 4, in an electron ionization method, a method for conditioning the electrode of the ion source 10 will be specifically explained.

First, the ion source 10 is disassembled into a filament 11 and focusing electrode thereof, the sample introduction pipe 19, metal parts of an ion exit 21, the trap electrode 12 and the ionization chamber 20. Then, those parts are divided into metal parts requiring cleaning and insulating materials. In the filament 11, the electrode is cleaned except the insulating materials, and a new filament 11 is mounted after the cleaning. Also, the sample introduction pipe 19, metal parts of the ion exit 21, trap electrode 12 and ionization chamber 20 are polished by aluminum powder. After polishing for a specific time, the aluminum powder is removed from the respective parts, and the parts are washed in the organic solvent. Then, the respective metal parts are heated in an electric furnace for one hour at a temperature of 400° C. under the atmospheric pressure. Then, the respective parts are assembled into the original structure.

In the above embodiment, while the explanation has been made with respect to only the ion source, the same conditioning method of the electrode treatment as described above may be performed for the ion trap having the electrode made of stainless steel to obtain the same effects as those of the ion source.

The mass spectrometer of the present invention is structured as described above. When the mass spectrometer is used to analyze various sample gases for a long period of time, a specific sample is decomposed and deposited on the surfaces of the electrodes in the ion source or the ion trap of the mass spectrometer. Therefore, the operator or analyst has to periodically disassemble the ion source or ion trap to separate the metal parts made of stainless steel from the insulating materials. The metal parts are polished with the aluminum powder, and cleaned in an organic solvent. Then, they are conditioned for one hour at a temperature of 400° C., and thereafter, are assembled again. With the relatively simple treating method as described above, it is possible to prevent the specific component from adhering to the surfaces of the metal parts, so that the mass spectrometer can perform the stable analysis with the maximum performance, resulting in a high ratio of effect to cost.

While the invention has been explained with reference to the specific embodiments of the invention, the explanation is illustrative and the invention is limited only by the appended claims.

What is claimed is:

1. A method of preparing and reconditioning an electrode of a mass spectrometer for analyzing a sample gas, comprising:

making the electrode of the mass spectrometer, to be exposed to sample gas molecules, by stainless steel, and baking the electrode at a temperature in a range of 200° C. to 700° C. in an air atmosphere to form an oxide layer on the electrode.

2. A method of preparing and reconditioning an electrode according to claim 1, wherein said electrode made of stainless steel is reconditioned by baking at a temperature in a range of 200° C. to 700° C.

3. A method of preparing and reconditioning an electrode according to claim 1, wherein said electrode made of stainless steel includes a chromium dioxide and chromium oxide on an outer surface thereof.

4. A method of preparing and reconditioning an electrode of a mass spectrometer for analyzing a sample gas, comprising:

making the electrode of the mass spectrometer, to be exposed to sample gas molecules, by stainless steel, baking the electrode at a temperature in a range of 200° C. to 700° C. in an air atmosphere to form an oxide layer on the electrode, using the electrode in the mass spectrometer to be exposed to the sample gas molecules, and reconditioning the electrode by baking at a temperature in a range of 200° C. to 700° C. to reuse the electrode in the mass spectrometer.

* * * * *